(12) United States Patent
Care

(10) Patent No.: US 6,407,475 B1
(45) Date of Patent: Jun. 18, 2002

(54) BEARING LOAD CONTROL

(75) Inventor: Ian C D Care, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/553,289

(22) Filed: Apr. 20, 2000

(30) Foreign Application Priority Data

May 25, 1999 (GB) .............................................. 9912108

(51) Int. Cl.[7] .......................... F16C 25/06; F16C 19/52
(52) U.S. Cl. ........................................ 310/90.5; 310/90
(58) Field of Search .................. 310/90.5, 90, 68 B, 310/68 R; 318/115, 561, 570–571; 384/113, 448, 557, 563; 29/878.062, 477, 898.07, 898.09

(56) References Cited

U.S. PATENT DOCUMENTS

| | | | | |
|---|---|---|---|---|
| 3,806,818 A | * | 4/1974 | Uchiyama | 455/155.1 |
| 3,865,442 A | * | 2/1975 | Studer | 310/90.5 |
| 3,877,761 A | * | 4/1975 | Boden et al. | 310/90.5 |
| 4,514,123 A | | 4/1985 | Johnstone | |
| 4,992,964 A | * | 2/1991 | Sagara et al. | 702/43 |
| 5,032,751 A | | 7/1991 | Morita | |

FOREIGN PATENT DOCUMENTS

| | | |
|---|---|---|
| EP | 1022833 A2 * | 11/2000 |
| GB | 2172345 A | 9/1986 |
| GB | 2172939 A | 10/1986 |
| GB | 2199376 A | 7/1988 |

* cited by examiner

*Primary Examiner*—Tran Nguyen
(74) *Attorney, Agent, or Firm*—W. Warren Taltavull; Manelli, Denison & Selter PLLC

(57) ABSTRACT

A method of controlling bearing load comprises sensing the approach of a no-load condition in a bearing, generating a single in response thereto and applying a load to the bearing in a direction opposite to the direction of loading before the approach of said no-load condition whereby to take the bearing through the no-load condition in a rapid and controlled manner to a condition in which it is loaded in the opposite direction. Preferably the load is applied to the bearing by an electrostatic actuator in the form of a separate electromagnetic bearing surrounding the shaft.

20 Claims, 1 Drawing Sheet

BEARING LOAD CONTROL

FIELD OF THE INVENTION

This invention relates to the control of bearing load in assemblies incorporating shafts mounted in bearings. The invention is especially, but by no means exclusively, applicable in relation to compressor and turbine shaft bearings in gas turbine engines.

BACKGROUND OF THE INVENTION

Mechanical bearings incorporating bearing elements such as balls or rollers contained in bearing races have optimum performance and hence minimum wear when operating under the loading conditions for which they are designed. At loads other than the optimum loading, and particularly at loads approaching zero, slippage of the bearing races can occur. This in turn can give rise to overheating and/or damage to components of the bearing resulting in reduced bearing life.

Gas turbine aircraft engines are generally mounted on aircraft at a small inclination to the horizontal. When the aircraft is at rest there is therefore a loading in one direction on the bearings in which the main compressor and turbine shafts are mounted. When the engine starts, air is drawn into the engine and loads the shaft bearings in the opposite direction. As a result the bearings pass through a zero load condition during start up. This zero load point can also be reached during transient manoeuvres. It is an object of the present invention to provide a method and means whereby this condition is maintained for as short a time as possible.

SUMMARY OF THE INVENTION

According to one aspect of the invention there is provided a method of controlling bearing load comprising sensing the approach of a no-load condition in a bearing, generating a signal in response thereto, and applying a load to the bearing in an appropriate direction in response to said signal.

Preferably the approach of the no-load condition is sensed by sensing the relative speed of a bearing race and rolling elements of the bearing. We have found that such changes in relative speed result in changes in electrostatic charges at opposite sides of the rolling elements of a bearing, hence signalling the approach of a no-load condition. Accordingly said sensing is preferably effected by sensing changes in electrostatic charges in the bearing.

Thus according to a further aspect of the invention there is provided a method of sensing the approach of a no-load condition in a bearing comprising sensing changes in electrostatic charges in the bearing generated on the approach of the said condition. Advantageously the method may be employed in a method of controlling bearing load by generating a signal in response to said changes and applying a load to the bearing in an appropriate direction in response to said signal.

The direction of said applied load may correspond to the direction of loading of the bearing before the approach to said no-load condition to restore the original loading condition. Alternatively, the direction of the applied load may be opposite to the direction of loading before the approach of said no-load condition, whereby to move the bearing quickly through the no-load condition to a condition in which it is loaded in the opposite direction.

Preferably said applied load is produced by an electromagnetic actuator operated in response to said signal.

The invention also provides apparatus for controlling bearing load comprising sensing means for sensing the approach of a no-load condition in the bearing, means for generating a signal in response thereto, and means for applying a load to the bearing in an appropriate direction in response to said signal.

Preferably, said sensing means comprises means for sensing changes in the relative speed of a bearing race and rolling elements of the bearing. Advantageously said sensing means comprises means for sensing changes in electrostatic charges in the bearing resulting from said changes in relative speed.

Said sensing means is preferably a non-contact sensor. The sensing means may comprise a proximity sensor, a radioactive tracer or, preferably, an electrostatic sensor. The invention also provides apparatus for sensing the approach of a no-load condition in a bearing including means for sensing changes in electrostatic charges in the bearing generated on the approach of the said condition. Advantageously the apparatus may include means for generating a signal in response to said changes and means for applying a load to the bearing in response to said signal.

The direction of said applied load may correspond to the direction of loading of the bearing before the approach to said no-load condition to restore the original loading condition. Alternatively, the direction of the applied load may be opposite to the direction of loading before the approach of said no-load condition whereby to take the bearing quickly through the no-load condition to a condition in which it is loaded in the opposite direction.

Preferably said means for applying said load comprises an electromagnetic actuator. Preferably said actuator comprises a variable or 'active' electromagnetic bearing surrounding said shaft. Preferably said electromagnetic bearing has both radial and axial thrust capabilities.

As applied to the main shaft bearings of a gas turbine engine, said load is preferably applied in the opposite direction to the initial direction of loading, whereby to take the shaft bearings through the no-load condition generated on start-up in a rapid and controlled manner.

The invention also includes a gas turbine engine including apparatus for controlling bearing load as aforesaid.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
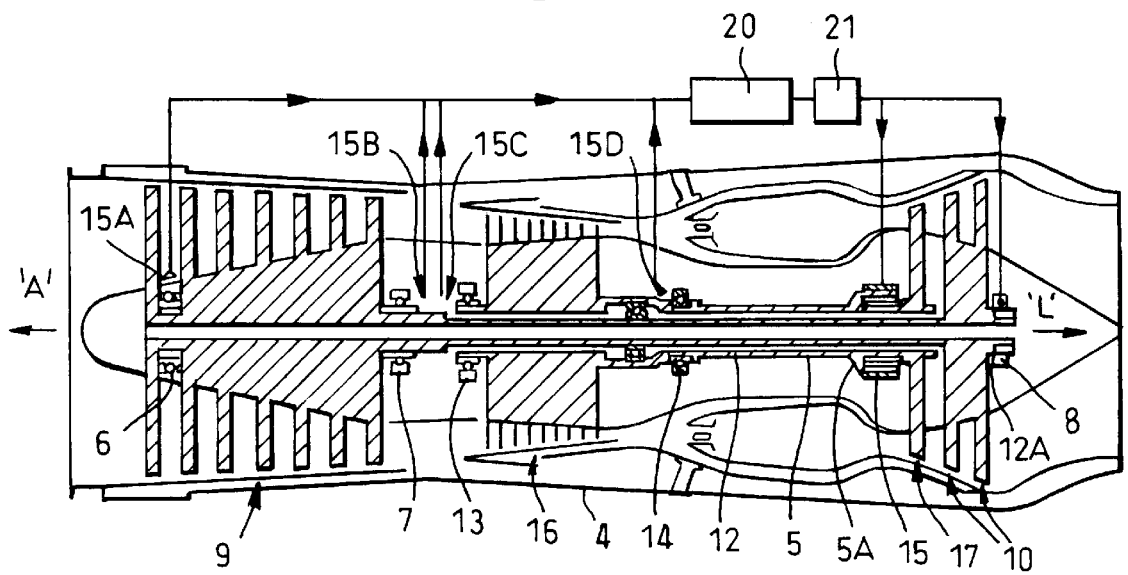
FIG. 1 is a diagrammatic cross section through a gas turbine aircraft engine incorporating apparatus for controlling bearing load according to the invention.

Referring to FIG. 1, there is shown a gas turbine aircraft engine including a casing 4 in which a shaft 5 is mounted on front, intermediate and rear bearings 6, 7 and 8. A low pressure compressor 9 is mounted on the forward end of the shaft 5 and a low pressure turbine 10 is mounted on the rear end of the shaft 5. A further shaft 12 surrounds a portion of the shaft 5 and is supported in the casing 4 by front, intermediate and rear bearings 13, 14 and 15. A high pressure compressor 16 and a high pressure turbine 17 are mounted on the forward and rear ends respectively of the shaft 12. In the embodiment the forward and intermediate bearings 6, 7, 13 and 14 are mechanical bearings incorporating balls or other rolling members retained between bearing races, and the rear journal bearings 8 and 15 are electromagnetic bearings.

Due to the manner of mounting of the engine on an aircraft, the shafts 5 and 12 are normally inclined at around three degrees to the horizontal. As a result there is a static axial load on the bearings 6–8 and 13–15 in the direction of the arrow 'L' in the drawing. When the engine starts, thrust generated by the action of drawing air into the front of the compressor (from the left in the drawing), applies an axial force to the shafts 5 and 12 in the opposite direction. Consequently, during start-up, the bearings on which the shafts are mounted pass through a zero load condition when the thrust generated is equal and opposite to the axial component of the weight of the engine. This can result in bearing slippage and resultant wear and damage to conventional mechanical bearings as referred to above.

In order to control the load on the forward and intermediate bearings 6, 7, 13 and 14 and thereby reduce wear and damage, electrostatic sensors 15A to 15D are mounted adjacent the respective bearings and are connected by an electrical circuit to the electromagnetic bearings 8 and 15. Signals generated by the sensors control the electromagnetic bearings 8 and 15 which serve as electromagnetic actuators to apply loads to the respective shafts 5 and 12 through collars 5A and 12A in a direction opposite to the initial axial load to thereby take the mechanical bearings 6, 7, 13 and 14 through the no-load condition to a more stable condition in which they remain during running of the engine.

Each electrostatic sensor 15A to 15D is mounted in a position adjacent to an associated one of the bearings 6, 7, 13 and 14 in which it can sense changes in static charges between the components of the bearing. By use of an appropriate electrostatic sensor, the relevant changes can be sensed from a position adjacent the bearing without interfering with the integrity of the races or other components of the bearing. Each sensor generates a signal in response to changes in electrostatic charge on either side of the balls, rollers or other rolling elements of the bearing which arise when the speed and/or direction of movement of the rolling elements relative to the bearing races in which they run occur as a no-load condition is approached. The sensors thus generate a signal before the no-load condition is reached.

The signals from the sensors 15A to 15D are processed in a digital controller 20 and transmitted through a power amplifier 21 to the respective active electromagnetic bearings 8 and 15. Although shown separately in FIG. 1, the digital controller 20 and power amplifier 21 may be located in the same housing. The digital controller incorporates independent control circuits one associated with each pair of sensors 15A, 15D and 15B, 15C and the associated electromagnetic bearings 8 and 15. Each of the electromagnetic bearings incorporates a plurality of electromagnets associated with the respective shaft 5 or 12 and operable to generate both radial forces operable to support the shaft for rotation about its longitudinal axis, and axial forces which are applied to the associated shaft through the collars 5A or 12A. The flux density in the electromagnetic coils is varied in response to the signals derived from the sensors 15A to 15D through the associated circuits in the controller 20 and amplifier 21. The direction of the generated force is arranged to apply an axial load to the associated shaft in the direction opposite to the initial loading, that is in the direction of the arrow 'A' in the drawing. This load takes the forward and intermediate bearings through the unstable no-load condition in a rapid but controlled manner to a stable condition in which they operate during running of the engine. The digital controller determines the coil current required and hence the flux density generated to apply the desired axial force to the shaft.

The electromagnetic bearings 8 and 15 serve the dual function of supporting the rear ends of the associated shafts 5 and 12 and of enabling control of the axial loading applied to the forward and intermediate bearings 6, 7, 13 and 14 on the approach of an unstable no-load condition as described above. In this way the period of time during which the mechanical bearing assemblies are in an unstable no-load condition is minimised, wear and damage are reduced and hence bearing life increased. Alternatively, the arrangement enables smaller or lighter bearings to be employed with a similar working life at lower cost due to removal of the need for pre-loading devices conventionally employed.

Figure 2:
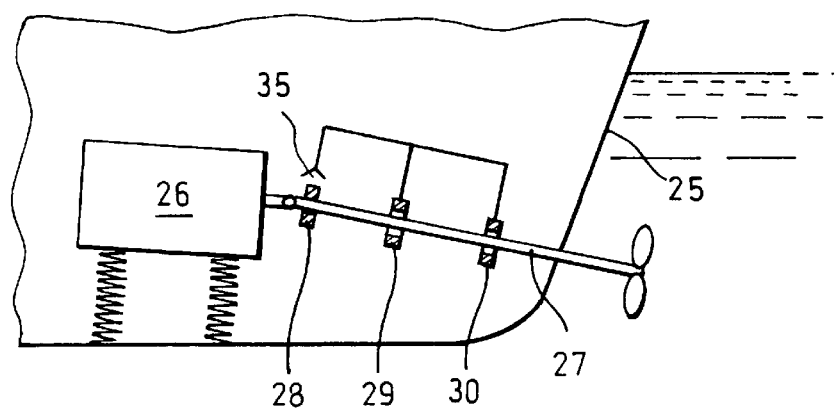
FIG. 2 is a diagrammatic cross-section showing an embodiment of the invention applied to a ship's propeller.

Similar conditions can arise in ships due to inclination of the ship's propeller shaft. A no-load condition therefore arises on start-up and also when changing from forward to reverse or vice versa. FIG. 2 shows part 25 of a ship's hull housing an engine 26 driving a propeller shaft 27 mounted in a main mechanical thrust bearing 28 and a pair of electromagnetic bearings 29 and 30. An electrostatic sensor 35 is mounted adjacent the bearing 28 and generates a signal in response to changes in electrostatic charges in the bearing on the approach of a no-load condition. The signal is processed in the manner of the signal generated in the FIG. 1 embodiment and controls the electromagnetic bearings 29 and 30 to apply an axial load to the propeller shaft 27 to move it in a rapid but controlled manner through the no-load condition.

Various modifications may be made without departing from the invention. For example, while in the embodiment, control of the loading applied to the mechanical bearings on the approach of a no-load condition is effected by electromagnetic bearings which support the rear ends of the associated shafts, loading could be controlled by separate electromagnetic or other actuators located adjacent to the respective bearings or elsewhere along the associated shafts. The shafts may be supported solely by mechanical bearings any one or more of which may be provided with an associated sensor connected to an electromagnetic or other actuator in the manner described. Moreover, while the invention has been described primarily with reference to gas turbine aircraft engines and ship propellers, it is equally applicable to industrial gas turbine engines and more widely in any case in which bearings are employed in situations in which a no-load condition may occur during operation.

It should also be appreciated that while reference has been made herein to generation of a corrective axial load, the invention may equally be employed to vary radial or other loading. Radial bearings may also experience zero load conditions as temperature effects change mass distribution and shaft balance. Thus, the electromagnetic bearings in the embodiment may be provided with additional electromagnetic coils adapted to apply a radial load to the associated shafts at a controllable angular position to counteract bending stresses or reduce vibration when energised by associated load, position or vibration sensors. A further example of such a case is a car axle undergoing a hard manoeuvre or running on a slippery surface. Other known types of sensing means may also be employed, including capacitive sensors, ferromagnetic sensors, and optical or other sensors.

The invention may also be employed to avoid a no-load or other unstable condition by applying a load to restore the initial loading condition following sensing of the approach of an undesirable condition. Moreover in its wider aspects, the signal generated on the approach of a no-load condition may be employed for other purposes, for example to shut down equipment to prevent instability or failure.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method of controlling bearing load comprising sensing an approaching of a no-load condition in a bearing, generating a signal in response thereto, and applying a load to the bearing in an appropriate direction in response to said signal.

2. A method according to claim 1 wherein the approach of the no-load condition is sensed by sensing changes in relative speed of a bearing race and rolling elements of the bearing.

3. A method according to claim 2 wherein said sensing is effected by sensing changes in electrostatic charges in the bearing.

4. A method according to claim 3 wherein said bearing has an original loading condition and the direction of said applied load corresponds to the direction of loading of the bearing before approaching said no-load condition to restore said original loading condition.

5. A method according to claim 3 wherein the direction of said applied load is opposite to the direction of loading before the approach of said no-load condition, whereby to take the bearing quickly through the no-load condition to condition in which it is loaded in the opposite direction.

6. A method according to claim 4 wherein said applied load is produced by an electromagnetic actuator operable in response to said signal.

7. Apparatus for controlling bearing load comprising means for sensing an approach of a no-load condition in a bearing with the bearing having an original loading condition and means for generating a signal in response thereto, and means for applying a load to the bearing in an appropriate direction in response to said signal.

8. Apparatus according to claim 7 wherein said sensing means comprises means for sensing changes in the relative speed of a bearing race and rolling elements of the bearing.

9. Apparatus according to claim 8 wherein said sensing means comprises means for sensing changes in electrostatic charges in the bearing resulting from said changes in relative speed.

10. Apparatus according to claim 9 wherein said sensing means comprises a proximity sensor.

11. Apparatus according to claim 9 wherein said sensing means comprises a radioactive tracer.

12. Apparatus according to claim 9 wherein the direction of said applied load corresponds to the direction of loading of the bearing before the approach of said no-load condition to restore the original loading condition.

13. Apparatus according to claim 12 wherein said means for applying said load comprises an electromagnetic actuator.

14. Apparatus according to claim 13 wherein said actuator comprises an electromagnetic bearing surrounding a shaft supported by the first-mentioned bearing.

15. Apparatus according to claim 14 wherein said electromagnetic bearing has both radial and axial thrust capabilities.

16. Apparatus according to claim 9 wherein the direction of said applied load is opposite to the direction of loading before the approach of said no-load condition whereby to take the bearing quickly through the no-load condition to a condition in which it is loaded in the opposite direction.

17. A gas turbine engine incorporating a drive shaft and apparatus according to claim 7, applied to a thrust bearing of the drive shaft, wherein said load is applied in the opposite direction to the initial direction of loading.

18. A gas turbine engine according to claim 17 incorporating apparatus according to claim 14, wherein said shaft is supported at a forward region by a mechanical thrust bearing and at a rearward region by an electromagnetic bearing.

19. A gas turbine engine according to claim 18 wherein said electromagnetic bearing incorporates means for applying a radial force to said shaft.

20. A propulsion system for a ship incorporating an engine driven propeller shaft and apparatus according to claim 7 applied to a thrust bearing in which the propeller shaft is mounted.

* * * * *